United States Patent
Ueffing

(10) Patent No.: US 8,886,514 B2
(45) Date of Patent: Nov. 11, 2014

(54) MEANS AND A METHOD FOR TRAINING A STATISTICAL MACHINE TRANSLATION SYSTEM UTILIZING A POSTERIOR PROBABILITY IN AN N-BEST TRANSLATION LIST

(75) Inventor: Nicola Ueffing, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 1238 days.

(21) Appl. No.: 12/310,224

(22) PCT Filed: Aug. 20, 2007

(86) PCT No.: PCT/CA2007/001491
§ 371 (c)(1),
(2), (4) Date: Feb. 18, 2009

(87) PCT Pub. No.: WO2008/019509
PCT Pub. Date: Feb. 21, 2008

(65) Prior Publication Data
US 2009/0326912 A1 Dec. 31, 2009

Related U.S. Application Data

(60) Provisional application No. 60/838,441, filed on Aug. 18, 2006.

(51) Int. Cl.
*G06F 17/28* (2006.01)
*G10L 15/26* (2006.01)

(52) U.S. Cl.
CPC ........... *G06F 17/2818* (2013.01); *G10L 15/265* (2013.01); *G06F 17/289* (2013.01); *G06F 17/2827* (2013.01)
USPC .............................................. 704/2; 704/235

(58) Field of Classification Search
CPC .............. G06F 17/289; G06F 17/2872; G06F 17/2827; G10L 15/265
USPC ...................................................... 704/3, 2, 1
See application file for complete search history.

(56) References Cited

U.S. PATENT DOCUMENTS 7,383,542 B2 * 6/2008 Richardson et al. .......... 717/137
(Continued)

FOREIGN PATENT DOCUMENTS

| WO | WO 03/105023 | 12/2003 |
|----|---|---|
| WO | WO 04/001623 | 12/2003 |
| WO | 2006/084234 | 8/2006 |

OTHER PUBLICATIONS

Ueffing, N. "Using Monolingual Source-Language Date to Improve MT Performance", Proceedings of IWSLT 2006. Kyoto, Japan, Nov. 27-28, 2006.
Ueffing No. "Self-training for Machine Translation" NIPS 2006 Workshop "Machine Learning for Multilingual Information Access" Whistler, BC, Dec. 9, 2006.

(Continued)

*Primary Examiner* — Farzad Kazeminezhad
(74) *Attorney, Agent, or Firm* — Jason E. J. Davis

(57) ABSTRACT

Existing statistical machine translation machines presently require the availability of a given source language text and an equivalent target language text and from target text to train a translation system. The invention proposes training a statistical machine translation system, more specifically it proposes a computer means and method for training a statistical machine translation system using unilingual source language information. The translation system relies on translations with confidence scores calculated as a posterior probability based on the similarity of a good translation hypothesis in an N-best list generated for a source sentence with N−1 other hypotheses in the said N-best list.

14 Claims, 5 Drawing Sheets flow chart of an embodiment of the invention

(56) References Cited

U.S. PATENT DOCUMENTS

| | | | |
|---|---|---|---|
| 7,454,326 B2* | 11/2008 | Marcu et al. | 704/2 |
| 2004/0255281 A1 | 12/2004 | Imamura et al. | |
| 2005/0049851 A1* | 3/2005 | Watanabe et al. | 704/2 |
| 2008/0033720 A1* | 2/2008 | Kankar et al. | 704/235 |
| 2009/0083023 A1* | 3/2009 | Foster et al. | 704/3 |

OTHER PUBLICATIONS

Callison-Burch et al., "Bootstrapping Parallel Corpora", Association for Computational Linguistics, Proceedings of the HLT-NAACL 2003 Workshop on Building and Using Parallel Texts: Data Driven Machine Translation and Beyond, Edmonton, Alberta Canada, p. 44-49.

* cited by examiner

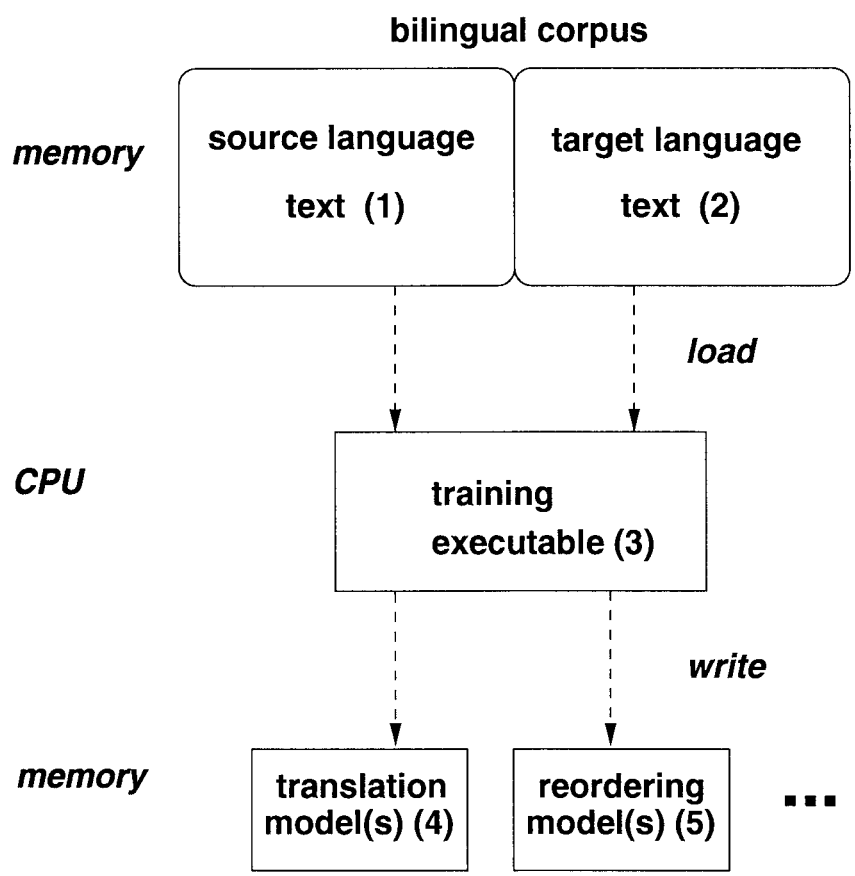
Figure 1: Training translation models (and other statistical models) on a bilingual corpus

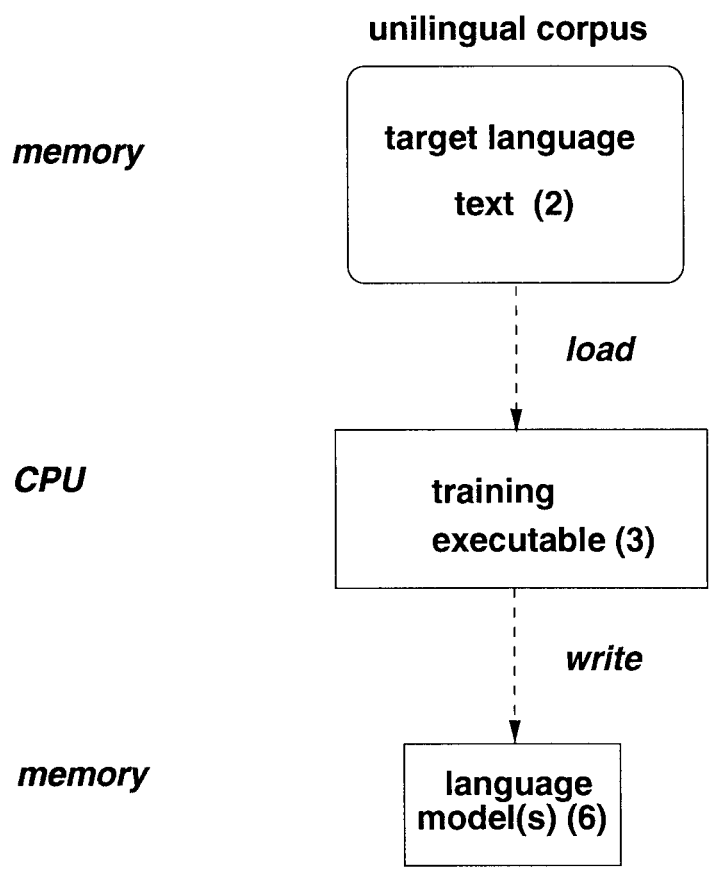
Figure 2: Training language models on a unilingual target language corpus

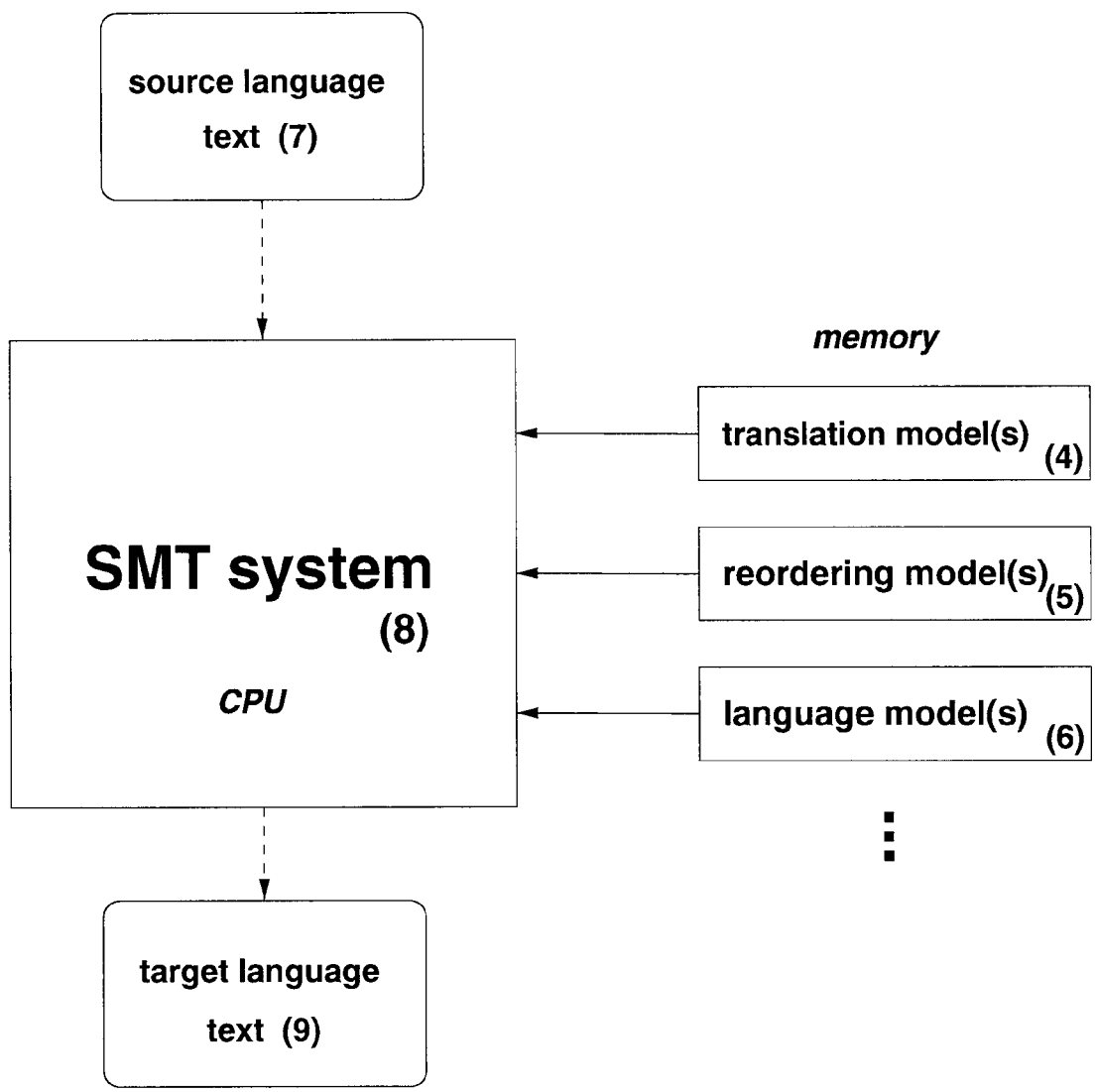
Figure 3: Translation using a SMT system

Figure 4: flow chart of an embodiment of the invention
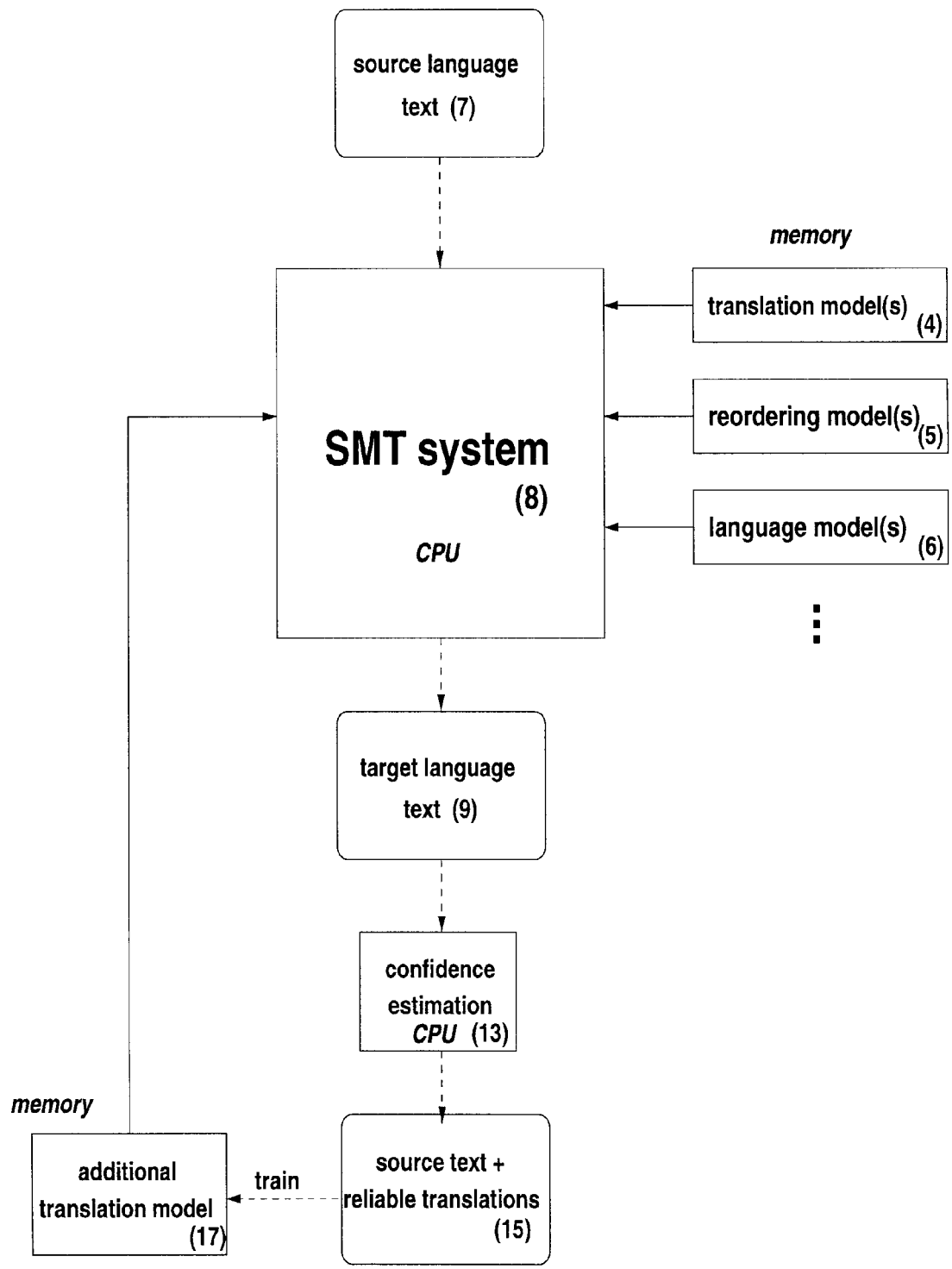

Figure 5: flow chart of an embodiment of the invention, using unilingual, comparable corpora in source and target language
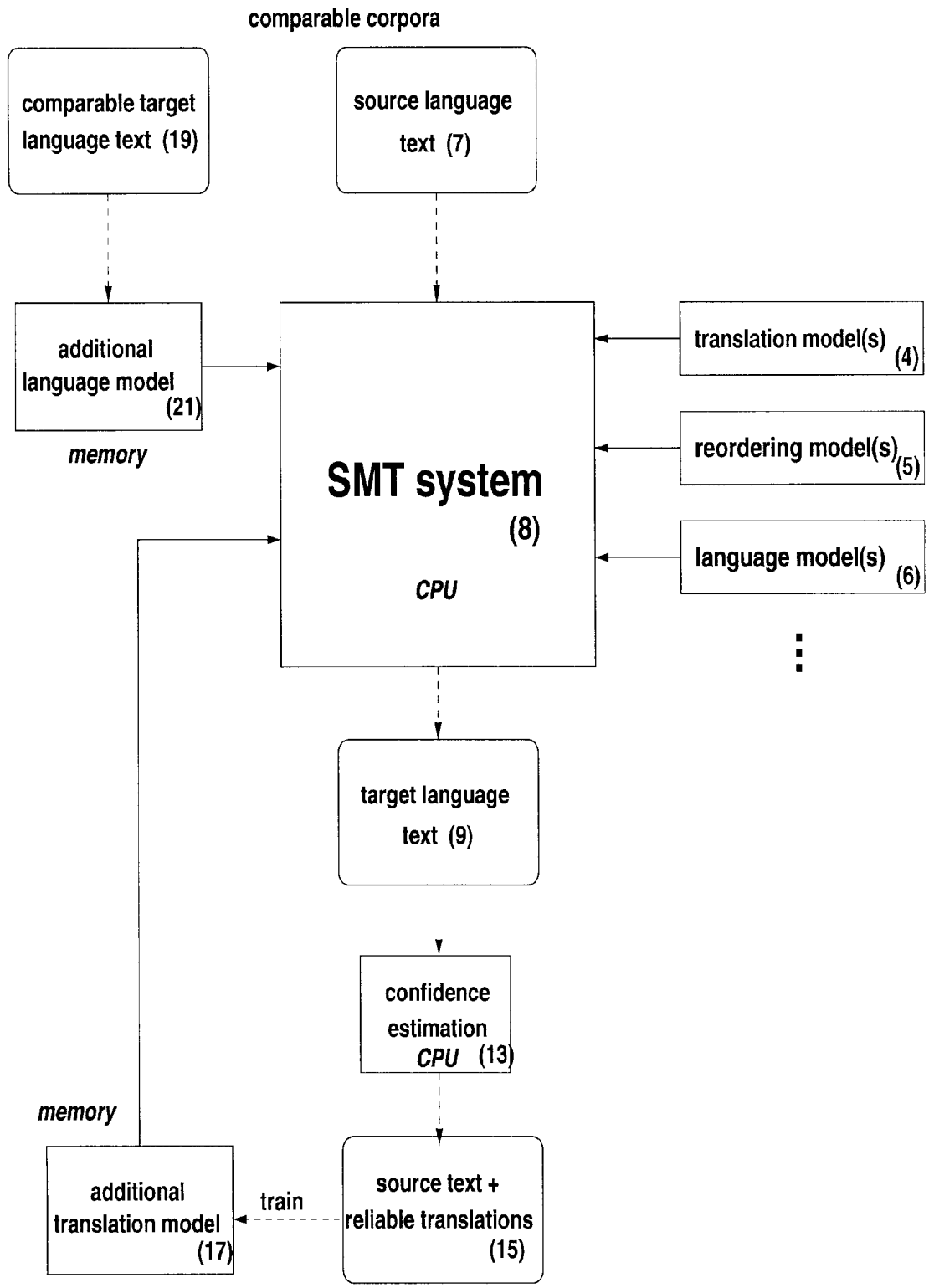

MEANS AND A METHOD FOR TRAINING A STATISTICAL MACHINE TRANSLATION SYSTEM UTILIZING A POSTERIOR PROBABILITY IN AN N-BEST TRANSLATION LIST

This application is a National Stage application of PCT Application PCT/CA2007/001491 filed 20 Aug. 2007 which claims benefit of U.S. Provisional Application 60/838,441 filed 18 Aug. 2006.

This invention relates to a computer means and a method implemented on a computer for training a statistical machine translation system, more specifically relates to a computer means and method for training a statistical machine translation system using unilingual source language information.

BACKGROUND

Existing statistical machine translation machines presently require the availability of bilingual parallel or comparable corpora of a given source and target language and from target text corpora for a given target language. But they do not benefit from the availability of text corpora of the given source language.

Let S represent a sentence in the source language (the language from which it is desired to translate) and T represent its translation in the target language. According to Bayes's Theorem, it can be shown for fixed S that the conditional probability of the target sentence T given the source, $P(T|S)$, is proportional to $P(S|T)*P(T)$. Thus, the earliest statistical machine translation systems (those implemented at IBM in the 1990s) sought to find a target-language sentence T that maximizes the product $P(S|T)*P(T)$, where $P(T)$ is the "language model", a statistical estimate of the probability of a given sequence of words in the target language. The parameters of the language model are estimated from large text corpora written in the target language. The parameters of the target-to-source translation model $P(S|T)$ are estimated from a parallel bilingual corpus, in which each sentence expressed in the source language is aligned with its translation in the target language.

There also exist methods which explore bilingual comparable corpora. Such comparable corpora are collections of documents in both the source language S and the target language T, where it is known or suspected that the documents discuss the same or similar subjects, using roughly the same level of formality, technicality, etc., without necessarily being translations of each other. The existing methods identify parallel sentences in the comparable corpora and extract these as parallel bilingual data. These methods do not work perfectly and make errors. Moreover, they are based on the prerequisite that there exist sentences in the comparable corpora which actually are parallel.

Today's statistical machine translation (SMT) systems do not function in a fundamentally different way from these 1990s IBM systems, although the details of the $P(S|T)$ model are often somewhat different, and other sources of information are often combined with the information from $P(S|T)$ and $P(T)$ in what is called a loglinear combination. This means that instead of finding a T that maximizes $P(S|T)*P(T)$, these systems search for a T that maximizes a function of the form $P(S|T)^{\alpha 1}*P(T)^{\alpha 2}*g_1(S,T)^{\beta 1}*g_2(S,T)^{\beta 2}* \ldots *g_K(S,T)^{\beta K}*h_1(T)^{\delta 1}*h_2(T)^{\delta 2}* \ldots *h_L(T)^{\delta L}$, where the functions $g_i(\ )$ generate a score based on both source sentence S and each target hypothesis T, and functions $h_j(\ )$ assess the quality of each T based on unilingual target-language information. Just as was done in the 1990s IBM systems, the parameters of $P(S|T)$ and $P(T)$ are typically estimated from bilingual parallel corpora and unilingual target-language text respectively. The parameters for functions $g_i(\ )$ are sometimes estimated from bilingual parallel corpora and sometimes set by a human designer; the functions $h_j(\ )$ are sometimes estimated from target-language corpora and sometimes set by a human designer (and of course, a mixture of all these strategies is possible). Both of these functions $g_i(\ )$ and $h_j(\ )$ might also explore additional sources of information, such as part of speech or syntactic annotation. This annotation is sometimes given for both source and target language and sometimes for only one of the two.

Thus, we see that today's statistical machine translation systems benefit from the availability of bilingual parallel or bilingual comparable corpora for the two relevant languages S and T, since such corpora may be useful in estimating the parameters of the translation model $P(S|T)$ and also, possibly, some bilingual components $g_i(\ )$. Such SMT systems also benefit from the availability of text corpora in the target language T, for estimating the parameters of the language model $P(T)$ and possibly other unilingual target-language components $h_j(\ )$. Some SMT systems also benefit from additional information contained in annotated text.

However, acquiring unilingual text corpora in the source language S is not presently useful in improving an SMT system. To give an example, suppose one has a system for translating Chinese sentences into English sentences, and a huge collection of Chinese-only documents (with no accompanying English translations) becomes available—such a collection is not presently useful in improving the quality of Chinese-to-English translations produced by the system.

SUMMARY OF INVENTION

The invention presents a means and a method of using unilingual source-language data to improve the performance of an SMT system.

Thereby the invention provides a system the ability to adapt to source-language text of a new type (e.g., text discussing new topics not present in the data originally used to train the system, or employing a different style, etc.) without requiring parallel or comparable training data in the target language.

An embodiment of the invention comprises a method for use with a translation computer system for training the translation computer system used for translating text from a given source language into a given target language, said method comprising the steps: 1) providing a new set of source sentence; 2) translating said new set of source sentence into a set of hypothesis target sentences; 3) identifying good translations in the set of hypothesis target sentences; 4) retaining said good translations; 5) creating a new parallel bilingual corpus comprising said retained good translations in the target language and their corresponding source sentences; 6) training one or more than one component of the statistical machine translation system to create an adapted statistical machine translation system using the said new parallel bilingual corpus.

There is an embodiment of the invention comprising a computer program for training a translation system used for translating text from a given source language into a given target language comprising a receiving means for receiving a new set of source sentences; a translating means for translating said new set of source sentences into a set of hypothesis target sentences; an identifying means for identifying said good hypothesis target sentences from said set of hypothesis target sentences; a retaining means for retaining said good hypothesis target sentences; a creating means for creating a new parallel bilingual corpus.

An embodiment of this invention comprises a computer readable memory comprising a translation system used for translating text from a given source language into a given target language, said translation system comprising a training module comprising; a receiving means for receiving a new set of source sentences; a translating means for translating said new set of source sentences into a set of hypothesis target sentences; an identifying means for identifying said good hypothesis target sentences from said set of hypothesis target sentences; a retaining means for retaining said good hypothesis target sentences; a creating means for creating a new parallel bilingual corpus.

SHORT DESCRIPTION OF THE FIGURES

FIG. 1 (prior art) illustrates a training module exploring bilingual text.

FIG. 2 (prior art) illustrates a flow chart of a training module which explores unilingual target language data.

FIG. 3 (prior art) illustrates a flow chart of a statistical machine translation system.

FIG. 4 illustrates a flow chart of an embodiment of the invention of a statistical machine translation system which is improved using unilingual source language data.

FIG. 5 illustrates a flow chart of an embodiment of the invention exploring comparable corpora.

DETAILED DESCRIPTION OF THE INVENTION

FIG. 1 (prior art) illustrates a flow chart of a computer training module exploring a bilingual corpus sent to it, comprising both source language text (1) stored on a computer readable medium and target language text (2) stored on a computer readable medium. The training executable (3) embedded in computer readable program code on a computer readable medium reads these texts (1 and 2) and estimates the parameters of the models which take both S (a sentence in the source language) and T (a sentence in the target language text) as input, such as the translation model(s) (4), the reordering model(s) (5), and others.

FIG. 2 (prior art) however illustrates a flow chart of a training module which explores a unilingual corpus stored on a computer readable medium comprising target language data (2). The training executable (3) embedded in computer readable code on a computer readable medium reads the text and estimates the parameters of the models which take only T (a sentence in the target language text) as input, such as language model(s) (6).

FIG. 3 illustrates a flow chart of a machine translation system. Models (4, 5) trained with executables (3) as described in FIGS. (1) and (2) are loaded into the system (8), and are used to translate the input text in the source language (7) stored on a computer readable memory is translated into the target language hypotheses (9) stored on a computer readable memory based on the scores that these models assign to the translations (given the source text).

In one embodiment of the invention as shown in FIG. (4), there is an existing SMT system (8) for use on a computer which receives some new source-language text (7), consisting of a set of D sentences The set of D sentences can comprise of one or more than one sentence. Furthermore these might be sentences for which we require translation (but not necessarily). In the current implementation of the invention, a phrase-based SMT system (8) is used. However, the same method can be applied to other types of SMT systems, such as word-based or syntax-based translation systems or systems based on finite-state transducers. In a phrase based SMT system, the translation model P(S|T) parameters are stored in a data structure called a "phrase table"; henceforth, the process of estimating these parameters will be referred to as "phrase table training".

For each of the source language sentences (7) in the set of D sentences, translations are generated using a machine translation system (8). Depending on the type of system which is employed, the translations can either come in the form of one translation per source sentence or a whole set of alternative translation hypotheses. These translation alternatives can be represented, for instance, as a so-called N-best list or a word graph (lattice). Using well-understood confidence estimation techniques (13), the confidence score C(H) assigned to a translation H can be calculated. Based on this confidence score, the system can filter the translation hypothesis by deciding for each of the D source-language sentences (7) in the set of D source sentences whether a trustworthy translation hypothesis (9) exists. For instance, a numerical threshold E can be used as a filtering means: if the confidence score C(Hd) of some hypothesis Hd for the d-th source-language sentence exceeds E, then the system retains Hd as a reliable translation for this sentence.

Alternatively, the system can retain translations for the entire set of D source-language sentences (7), even the ones with low confidence. In the following (re-)training steps, the translations could be weighted according to their confidence Independent of the filtering the confidence values can be used to increase/decrease the impact of sentences with high/low confidence in the training process In one embodiment of the invention, the SMT system (8) generates an N-best list of translation hypotheses (9) for each source sentence $S_d$. It then estimates the confidence of the top hypothesis $H_{d1}$, based on the relationship between this hypothesis and the other translations in the list. If this confidence is too low, the translation $H_{d1}$ is discarded, and the source sentence $S_d$ is left untranslated and not used for improving the system. If, however the confidence level is evaluated to be high enough, the translation $H_{d1}$ is retained.

It is possible to retain a single translation $H_{d1}$ for each source sentence $S_d$ but it is possible to retain more than one. The same technique can be applied to all hypotheses (9) in the N-best list (or word graph), allowing for different translations of the same source sentence $S_d$.

Thus, for some subset of the set of D source-language sentences comprising a high confidence level translation, one or several translations are generated and retained by the initial system. In one embodiment of the invention, each of the D sentences receives a maximum of one such translation, but a source sentence could retain several hypothesized translations for which the confidence score is considered high enough. The result is a new parallel bilingual corpus (15) comprising a subset of the original D source-language sentences, each accompanied by a reliable translation(s) (15). This composes new parallel bilingual corpus (15) which can then be used to train or retrain the SMT system, more specifically the translation model (3) or some other component of the SMT system such as a target language model (6), reordering model (5) and a sentence length model. Throughout this text the term train is meant to encompass both initial training of a component as well as retraining of a component.

In one embodiment of the invention, this new parallel bilingual corpus (15) is used to generate an additional translation model (17) for estimating P(S|T). If a phrase-based SMT system is used, this can be done using well-understood techniques for training phrase tables. Techniques for training phrase tables can involve first using so-called "IBM models" to align individual words in bilingual sentence pairs (the alignments connecting words in the source-language sentence with words in the parallel target-language sentence), and then using a phrase alignment algorithm such as Koehn's "diag-and" method to extract the phrase pairs that comprise the new phrase table.

In one embodiment of the invention (see FIG. 4), the new translation model (17) is used as a separate component along with the original translation model (4) in a loglinear or linear combination to obtain an adapted translation model, allowing the system to assign an individual weight to the added new translation model (17) (presumably, it is somewhat less reliable than the original translation model). Alternatively, the new parallel bilingual corpus (15) could be added to the existing bilingual parallel corpus (see FIG. 1, (1) and (2)), and the translation model (4) would be retrained on this enlarged collection.

Note that in other embodiments of the invention other types of models can also be trained on the new parallel bilingual corpus (15), for instance, but not excluded to, a language model (6), a reordering model (5), a sentence length model, etc.

To generate the confidence score for a given translation hypothesis, the current implementation of the invention relies on a combination of different confidence features:
1) a posterior probability which is based on the similarity of that hypothesis with the N−1 other hypotheses in an N-best list generated for the same source sentence, and 2) a posterior probability based on the phrase alignment determined by the SMT system, and 3) a language model score for the given hypothesis. However, many other approaches are also possible for the calculation of the confidence score, such as those based on other variants of posterior probabilities, more complex translation and language models, on semantic and syntactic information, etc.

As an example of why the approach of retraining the SMT system on its own output works, suppose that (A B) and (C D E) each occurred in the parallel corpus used to train the original phrase table modeling P(S|T), but not contiguously. If in the additional unilingual source-language data the sequence "A B C D E" occurs frequently, the system has the opportunity to generate new source phrases: e.g., (A B C), (B C D E), (A B C D E). If the target-language translations generated for these phrases receive a high confidence score, this enables new bilingual phrases to be learned and put into the new phrase table.

In addition to the ability of learning new phrase pairs, the method identifies and reinforces the parts of the model which are relevant for translating the given source sentences. It thereby provides a means of adapting the SMT system to a new domain or style of text without requiring bilingual text.

Note that this process of generating hypothesized translations from unilingual source data that are used to train and/or retrain the system's models (after filtering out the less reliable hypothesized translations) can be an iterative process. That is, once the system's models have been retrained, the system can be used to generate new hypothesized translations for unilingual source data (either the same data as before, or new unilingual source data) which are then used to retrain the system's models, and so on.

In one embodiment of the invention, a human being would perform some or all of the filtering role currently performed by the confidence score. For instance, the system might generate N translation hypotheses for each new source sentence; the human being could select one or several of these, or reject them all. This would be much faster than asking the human being to translate the sentences himself or herself. In fact, it might not be necessary for a human being who understood the source language to perform this task—knowledge of the target language might be sufficient. To reduce the human effort required, the system might only consult the human being in cases of maximal uncertainty (e.g., when the confidence score was neither very high nor very low). One might even permit the human being to post-edit some of the translation hypotheses. Alternatively, if a bilingual human being with knowledge of both the source and the target language were available, the system might try to determine which of the source-language sentences it had the greatest difficulty translating. These sentences—the sentences whose system-generated translations had the lowest confidence—would be presented to the human being for translation (or their hypothesized translations could be presented to the human being for post-editing). In this implementation, the human would help the system to improve its knowledge in the areas where that knowledge was most deficient.

This process could also be automated so that the information from the confidence estimation module (13) is fed back to the training module (see FIG. 1, (3)). The training module could explore the knowledge about which sentences are difficult to translate.

Another embodiment of the invention is to use another machine translation system (not necessarily one based on the statistical approach), e.g., a publicly available system, to translate the new unilingual source data. One would then carry out filtering, retain the reliable translations from the other system, and then train or retrain the SMT system using the resulting bilingual data. Thus, the SMT system could be adapted to a new domain or condition, and could exploit knowledge from the other system. This is not the same as what is often called "system combination" of machine translation systems, since system combination involves combining translation outputs from different systems rather than retraining one of the systems on output partially generated by another system.

In another embodiment of the invention, a unilingual source corpus is used to improve a generative model (such as the so-called IBM models) via the well-known estimation-maximization (EM) algorithm. Generative models are models which explicitly explain how the translation is assumed to have been generated by calculating joint probabilities P(S,T). Consider the equation $P(S)=\Sigma_T P(S,T)=\Sigma_T P(S|T)*P(T)$.

In this implementation, one would begin with initial parameter estimates for P(S|T) and P(T) (the former estimated from a bilingual corpus (FIG. 1), the latter from a unilingual target-language corpus (FIG. 2)) then use the EM algorithm to find parameters that maximize the value of P(S) for all sentences S in the unilingual source-language data.

An example of data for which the invention will work well is for bilingual comparable corpora (see FIG. 5).

For instance, consider two textbooks on the treatment of infectious diseases designed for first-year medical students, one written by Chinese authors in Chinese and published in China (the comparable source language text (7) in this example), the other written by American authors in English and published in the USA (the comparable target language text (19) in this example). Neither book is a translation of the other, and the structuring of the material into chapters, sections, and sentences may be quite different, but one might nevertheless suspect that many of the phrases in one book have equivalents in the other. Suppose one wishes to improve an existing Chinese-to-English SMT system (and specialize it for this medical domain) by using these two texts as new training data, in addition to the bilingual training data originally used to train the original system. One could first train a new English statistical language model on the English medical text (the comparable target language text (19)), using this new language model (17) as a loglinear component for a second version of the system. Then, one could translate the unilingual Chinese-language medical text (the source text (7) in this example) using this second version of the SMT system (7'), retaining the translations with the highest confidence and using them to train a third version of the system, according to the method described earlier. This third version of the system would have improved translation performance (especially on Chinese input text dealing with medicine) without having been retrained on a bilingual parallel corpus (recall that neither the Chinese nor the American textbook in the example is a translation of the other). In this example the system is being retrained with a new target language set of documents (the English text). This newly obtained SMT system is then used to translate the Chinese text as a new source language set of documents into English, filtering out bad translations and obtaining a new bilingual training corpus (15'); the new bilingual training corpus from that iteration is used to retrain the SMT system (7') and obtain a new Chinese-to-English system which is better suited for translating medical texts. Thus, the invention provides a particularly effective means of exploiting the information in bilingual comparable corpora, although it is also effective in the case where only unilingual source-language corpora are available.

The invention claimed is:

1. A method performed by a computer system for improving a statistical machine translation (SMT) system for translation of text from a given source language into a given target language, said method comprising:
   1) receiving at the computer system, a new set of source sentences of the source language;
   2) receiving at the computer system, translations of each source sentence in said new set of source sentences into a respective set of hypothesis target sentences of the target language from a machine translation (MT) system;
   3) identifying at the computer system, good translations in the respective sets of hypothesis target sentences where a good translation is a hypothesis target sentence having a confidence score higher than a set value, the confidence score for a given hypothesis target sentence being calculated as a posterior probability based on the similarity of that hypothesis with the N−1 other hypotheses in an N-best list generated for the same source sentence, a posterior probability based on the phrase alignment determined by the SMT system, and a language model score for the given hypothesis;
   4) retaining said good translations;
   5) creating a new parallel bilingual corpus comprising said retained good translations and their corresponding source sentences;
   6) training one or more than one component for the SMT system using the new parallel bilingual corpus at the computer system; and
   7) adding the newly trained one or more components to original components associated with the SMT system to produce an adapted component with the new and original components kept as a separate components of methods associated with the SMT system;
   wherein the method employs no human verification.

2. The method of claim 1 where the translation of the new set of source sentences is done by the SMT system, which is the MT system.

3. The method of claim 1 where the training of the one or more than one component is done by a training executable.

4. The method of claim 3 where one of the components being trained is a translation model.

5. The method of claim 1, 3, or 4 where one or more than one component being trained is one or more than one component selected from a list comprising: a target language model, reordering model and a sentence length model.

6. The method of claim 1 wherein adding the newly trained one or more components comprises:
   obtaining an original translation model of the SMT system; and
   combining the original translation model and one of the newly trained one or more than one components, the new component being a new translation model.

7. The method of claim 6 wherein combining the original translation model and the newly trained one or more than one components is performed in a linear or loglinear manner to obtain an adapted translation model.

8. The method of claim 1 where the step of translating said new set of source sentences into target sentences results in an Nbest list of hypothesis target sentences.

9. The method of claim 1 where the steps of receiving translations of each source sentence in said new set of source sentence into a set of hypothesis target sentences, identifying good translations in the respective sets of hypothesis target sentences and retaining said good translations used to retrain said statistical machine translation system to create an adapted statistical machine translation system is an iterative process where the new set of source sentence can be retranslated by the adapted statistical machine translation system.

10. The method of claim 1:
    wherein providing said new set of source sentences further comprises providing a set of comparable target language sentences where said set of comparable target language sentences is a comparable text to said new set of source sentences; and
    further comprising training a target language model on said target language sentences and integrating this into the SMT system to obtain an adapted system.

11. A non-transitory computer readable memory storing a computer program for training a component for a statistical machine translation (SMT) system, the computer program comprising program instructions for directing a processor to:
    receive a new set of source sentences of a given source language and, for each source sentence, a set of hypothesis target sentences of a given target language output by a machine translation (MT) system for translating the source language into the target language;
    identify good hypothesis target sentences from said set of hypothesis target sentences where a good translation is a hypothesis target sentence having a confidence score higher than a set value, the confidence score for a given hypothesis target sentence being calculated as a posterior probability based on the similarity of that hypothesis with the N−1 other hypotheses in an N-best list generated for the same source sentence, a posterior probability based on the phrase alignment determined by the SMT system, and a language model score for the given hypothesis;
    retain said good hypothesis target sentences; and
    train one or more SMT system components using the good hypothesis target sentences and their respective corresponding source sentences,
    wherein the SMT system components are generated for the SMT system from the output from the MT system, without human verification.

12. The computer readable memory of said claim 11 comprising program instructions for sending said one or more SMT system components to said SMT system.

13. The computer readable memory of claim 11 where training one or more SMT system components comprises generating one or more of: a translation model, a target language model, reordering model and a sentence length model.

14. A non-transitory computer readable memory storing a statistical machine translation (SMT) system and program instructions for directing a processor to;
receive a new set of source sentences;
translate each source sentence of said new set into a respective set of hypothesis target sentences with the SMT system;
identify good hypothesis target sentences from each of said respective sets of hypothesis target sentences where a good translation is a hypothesis target sentence having a confidence score higher than a set value, the confidence score for a given hypothesis target sentence being calculated as a posterior probability based on the similarity of that hypothesis with the N−1 other hypotheses in an N-best list generated for the same source sentence, a posterior probability based on the phrase alignment determined by the SMT system, and a language model score for the given hypothesis;
retain said good hypothesis target sentences; and
create a new parallel bilingual corpus including only the retained good hypothesis target sentences, and their corresponding source sentences,
wherein the program requires no human verification to output the parallel bilingual corpus useful for improving the quality of translations from the source to target language by the SMT with only the input of source language sentences.

* * * * *